Figure 1:
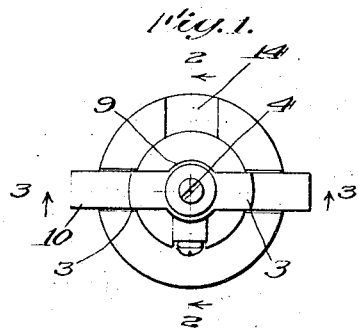

No. 879,723.  
PATENTED FEB. 18, 1908.

R. B. BENJAMIN.  
ATTACHMENT PLUG.  
APPLICATION FILED JAN. 29, 1904.

3 SHEETS—SHEET 1.

Witnesses:  
JB Weir  
Curtis B Camp

Inventor:  
Reuben B Benjamin  
By Jones & Addington  
Attorneys

No. 879,723. PATENTED FEB. 18, 1908.
R. B. BENJAMIN.
ATTACHMENT PLUG.
APPLICATION FILED JAN. 29, 1904.
3 SHEETS—SHEET 2.
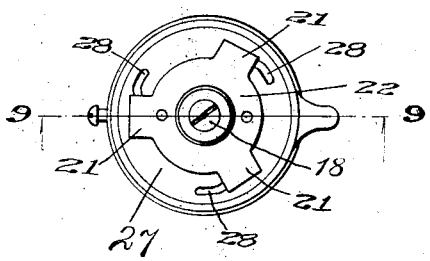
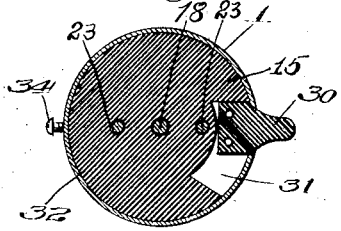
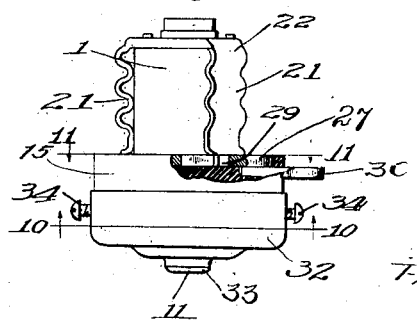
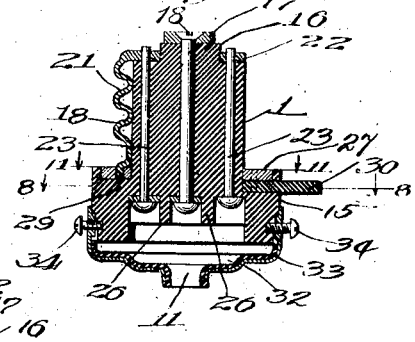
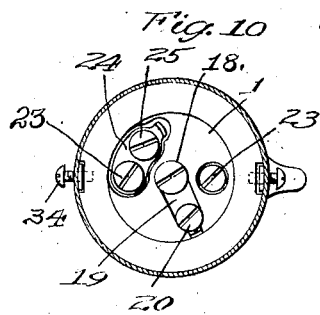
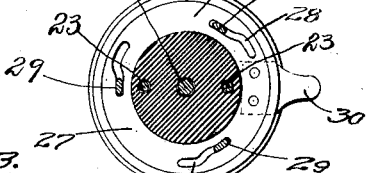
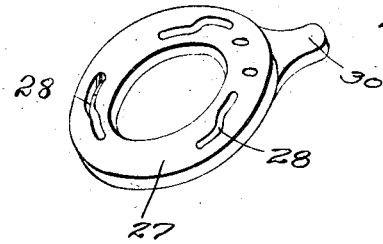
Witnesses:
J B Weir
Curtis B Camp
Inventor:
Reuben B Benjamin
By Jones & Addington
Attorneys

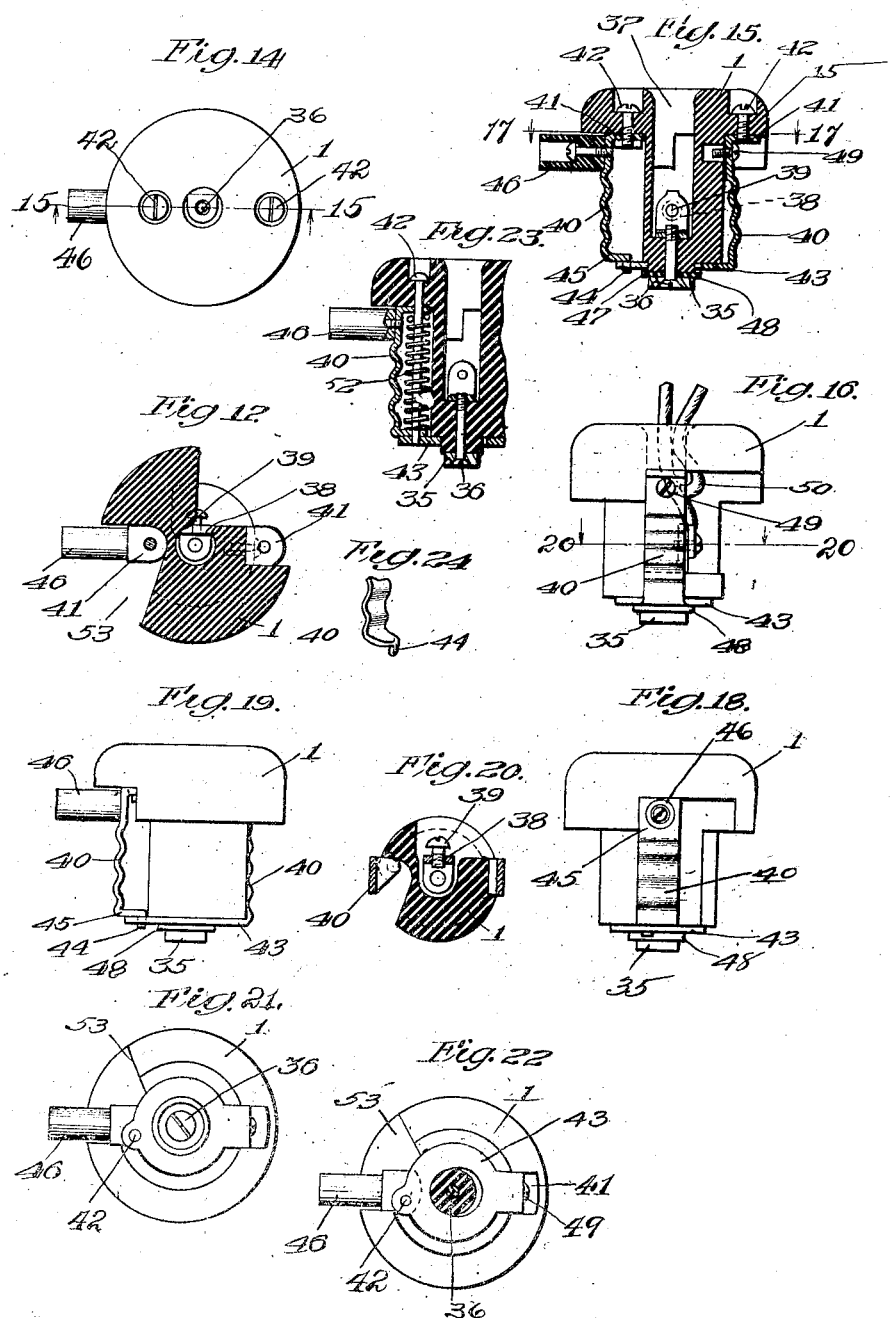

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ATTACHMENT-PLUG.

No. 879,723.

Specification of Letters Patent.

Patented Feb. 18, 1908.

Application filed January 29, 1904. Serial No. 191,172.

*To all whom it may concern:*

Be it known that I, REUBEN B. BENJAMIN, a citizen of the United States, residing at Chicago, in the county of Cook and State of Illinois, have invented new and useful Improvements in Attachment-Plugs, of which the following is a full, clear, concise, and exact description, reference being had to the accompanying drawing, forming a part of this specification.

My invention relates to an attachment plug for electric lamp sockets, and has for one of its objects the production of an attachment that can be inserted and removed from the lamp socket without rotating the plug.

Another object of my invention is to provide a lock or stop for retaining the plug attachment in position in the socket, and in firm electrical contact therewith to prevent the plug from becoming partially detached therefrom, and the consequent arcing between the contacts.

Figure 2:
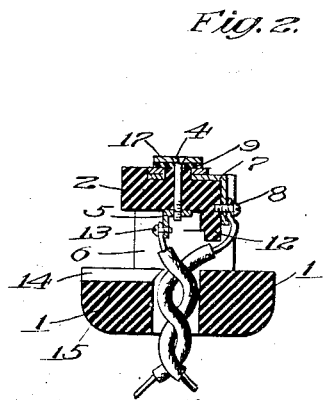
Figure 3:
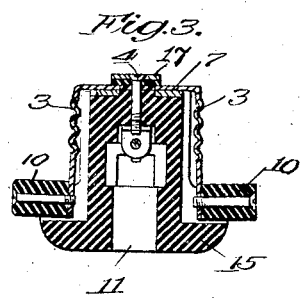
Figure 4:
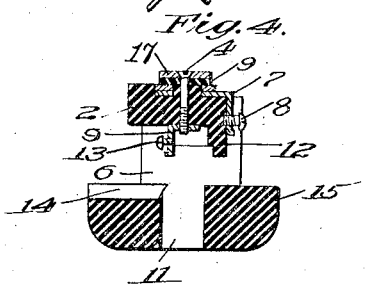
Figure 5:
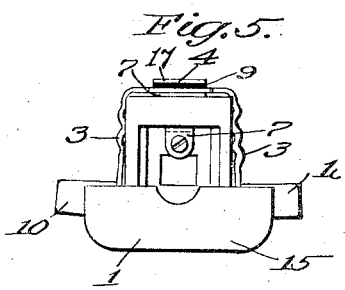

The other novel features of my invention will appear from the accompanying drawings in which like reference characters indicate like parts throughout the several figures, and in which:

Figure 1 is an inside end view of my improved plug attachment; Fig. 2 is a sectional view on the line 2—2 of Fig. 1; Fig. 3 is a sectional view on the line 3—3 of Fig. 1; Fig. 4 is a modified form of the view shown in Fig. 2; Fig. 5 is a side elevation of my invention; Fig. 6 is a sectional view of another form of my improved plug attachment; Fig. 7 is an inside end view thereof; Fig. 8 is a view on the line 8—8 of Fig. 6; Fig. 9 is a side elevation with a portion broken away; Fig. 10 is a view on the line 10—10 of Fig. 9; Fig. 11 is a view on the line 11—11 of Fig. 6; Fig. 12 is the same as Fig. 6 showing center spring contact; Fig. 13 is a detail view of the locking ring; Fig. 14 is a front end view of another form of my improved attachment plug; Fig. 15 is a sectional view on the line 15—15 of Fig. 14; Fig. 16 is a side elevation of this form of my invention; Fig. 17 is a sectional view on the line 17—17 of Fig. 15; Fig. 18 is another side elevation of this form of my invention; Fig. 19 is still another side elevation thereof; Fig. 20 is a sectional view on the line 20—20 of Fig. 16; Fig. 21 is an inside end view; Fig. 22 is the same as Fig. 21, showing a portion of the base in section; Fig. 23 is a sectional view showing a modification of my invention; and, Fig. 24 is a detail view of one of the outer contact plates.

Referring to Figs. 1 to 5, inclusive, I provide a base 1 of porcelain or other insulating material, preferably formed in two diameters, the smaller diameter 2 being adapted to enter the lamp socket. The outer contact is formed from strips or plates 3, of metal, having a screw threaded surface formed thereon, said strips or plates being preferably formed from a single piece of metal, and bent rearwardly over the base 1, said strips being secured in position by a bolt or screw 4, said screw securing the contact plate 5 in position within a recess 6 formed in said base, said screw also serving to secure the center contact 17 in position, an insulating washer 9 being disposed between said center contact and the contact strips 3, 3.

Disposed between the base 1 and the U-shaped outer contact plate 3, is a metal strip or plate 7, carrying the binding screw 8, said binding screw being preferably disposed in a recess in the side of the base 1. The screw threaded contact plates 3, are preferably formed of spring metal, and disposed with their side walls flaring rearwardly, as shown in Fig. 3. Insulating end pieces or tips 10, 10, are secured in any suitable manner to the free ends of said contact strips. An aperture 11 is provided in the top of the base 1, for the leading-in wires, a partition or projection 12 being formed upon the base 1, to insulate the binding posts or screws 8 and 13, from each other though this is not essential. A groove 14 may be formed in the flange or large diameter 15 of the base 1, to more readily afford access to the contacts, and to permit a knot to be formed in the leading-in wires.

It will be readily seen that by depressing the tips or end pieces 10, 10, the screw threaded contact plates 3, 3, will be moved radially or contracted, which will permit my attachment plug to be readily inserted in the lamp socket or removed therefrom, without rotating the same, the contact plate or washer 17 being brought into electrical engagement with the center contact of the socket, and the resilient quality of the contact plates 3, 3, securing the plug attachment securely in position therein when said tips or end pieces 10, 10, are released; said plug attachment also being removable from the socket without rotating the same by depressing the tips or end pieces 10, 10.

In Figs. 6 to 13, inclusive, I have illustrated another form of my invention, in which the insulating base 1, is preferably formed with an enlarged diameter 15. A centrally disposed projection 16 is formed upon the base 1, upon which the center lamp contact 17 is mounted, said center contact being held in position by a bolt or screw 18, passing through the base 1, said screw or bolt securing the contact plate 19 in position upon the front face of the base 1, said contact plate carrying the binding screw 20. The outer contact is formed by a plurality of screw threaded contact plates or strips 21, said strips being preferably formed integral with a ring 22, disposed upon the inner end of the base 1, said ring being held in position by bolts or screws 23, 23, passing through the base 1, one of said bolts or screws serving to secure the contact plate 24 in position upon the front face of the base, said plate carrying the binding screw 25. Projections 26, 26, may be formed upon the base 1 to insulate the screws or bolts 18 and 23, and the contact plates 19 and 24 from each other, said contact plates and said bolts being preferably disposed in a recess formed in the top of said base.

Disposed upon the inner surface or shoulder of the enlarged diameter 15, of the base 1, and preferably set in a recess therein, is a metal ring 27, said ring having a plurality of concentrically disposed slots or apertures 28 formed therein, the central portion of said apertures being eccentric or offset, said apertures being adapted to receive small projections 29 formed upon the free ends of the contact plates or strips 21. A handle or thumb piece 30 of insulating material is suitably secured to said ring, said handle being preferably disposed in a recess 31, formed in the base 1, the walls of said recess forming a stop for the ring 27 at both limits of its movement. As will be readily understood, the radial offset or eccentric portion of the slots or apertures 28 are adapted to radially move the screw threaded contact plates or pieces 21 when the ring 27 is rotated by the handle or thumb piece 30 secured thereto. The outer contact plates 21 are thus, by rotation of the ring 27 in one direction, contracted to permit my attachment to be inserted in a lamp socket, said plates being held in firm electrical engagement with the contact of the socket when said ring is rotated or moved in the opposite direction; the device as a whole being inserted in and withdrawn from the socket without rotating the same. Said contraction of the contact plates and the radial expansion thereof above described, to lock the attachment within the socket, does not preclude or prevent a slight rotation of the attachment after the attachment has been inserted in the socket, if a better electrical connection can be secured thereby. A metal cap or casing 32 is provided for the end of the base 1, a central aperture 11 being formed therein for the leading-in wires, said casing preferably having an insulating washer 33 disposed therein to insulate the leading-in wires therefrom, said cap and washer being secured in position thereon, by the screws 34 entering recesses formed in the base 1, or in any other suitable manner.

Referring to Figs. 14 to 22 inclusive, the insulating base 1, carries a contact plate or washer 35 secured upon the rear end thereof by the screw or bolt 36, said bolt also securing within the bottom of the longitudinal recess or aperture 37, the contact plate 38, carrying a binding screw 39. The outer contacts are preferably formed from screw threaded plates or strips 40, although this is not essential as any suitable form of plate may be substituted therefor, one end 41 of said strips being bent over and secured to the enlarged diameter 15 of the base 1 by screws 42, 42, one of said strips being loosely pivoted as will be hereinafter described. Secured to the free end of the other of said strips and disposed upon the rear end of the base 1, is a ring 43, the center contact 35 projecting through said ring, a portion 47 of the insulating base being also adapted to extend through the ring 43, said ring being slidably mounted upon the base 1 as will be hereinafter described, the insulating washer 48 serving to insulate said ring from the center contact 35. Formed in the ring 43 is a small aperture, adapted to receive a small projection or pin 44 formed upon the end 45 of the loosely pivoted contact plate 40. Secured to said loosely pivoted contact plate is a thumb piece or lever 46, of insulating material. The thumb piece or lever 46 is preferably disposed in a recess 53 formed in the base 1, the walls of said recess being adapted to form a stop for the lever at both limits of its movement. The binding screw or post 49 is mounted upon one of the outer contact plates or strips 40, the said binding screw being preferably disposed in a recess formed in the base 1, a channel or groove 50 for the leading-in wires leading from the longitudinal aperture 37 to said binding screw. The contact plate 40 is pivoted eccentrically as shown in Figs. 21 and 22, the contact surface of said plate being carried inwardly when the thumb piece or lever 46 is depressed, the ring 43 and the integrally connected contact plate 40, also being carried inwardly the central aperture or opening in said ring being suitably formed to permit said movement, as shown in Fig. 22. The contact plates 40 are held in an extended position against the movement of the lever 46 by the resilient quality of the ring contact plate 40, said plate, as before stated, being fixedly secured in position on the base 1 by the screw 42.

In Fig. 23 I have illustrated a modified form of my invention, in which the screw or bolt 42 extends downward through the ring 43, said screw loosely pivoting the bent over ends of the screw threaded contact plate 40 in an eccentric position. A coiled spring 52 being suitably disposed about the pin 42 against the power of which the thumb piece or lever 46 is adapted to move. It will be readily seen that when the thumb piece or lever is depressed, the eccentrically pivoted contact strip or plate 40, the ring 43 and its integrally connected contact strip 40, are contracted or moved inwardly, which permits the attachment plug to be readily inserted within the lamp socket, without rotating the same, the outward pressure or resilient quality of the contact strips or the spring 52 securely locking the plug in position therein when the pressure upon the lever 46 is released.

While I have described my invention with particular reference to the details of construction, I do not wish to limit myself to said details, as I am aware that many changes may be made therein without departing from the spirit of my invention, and I claim the benefit of all such changes as come within the spirit of my invention.

Having described my invention what I claim as new and desire to secure by Letters Patent is:

1. An attachment plug for electric lamp sockets comprising an insulating base, a movable lamp contact carried by said base, a ring having a slot formed therein associated with said base, said slot being adapted to engage said lamp contact, said ring being adapted to remove said contact from engagement with the lamp socket, to permit the plug to be inserted therein without rotating the plug.

2. An attachment plug for electric lamp sockets comprising an insulating base, a movable lamp contact carried by said base, a ring having a slot associated with said base, said slot being formed with a radial offset therein and being adapted to engage said lamp contact, said ring being adapted to remove said contact from engagement with the lamp socket, to permit the plug to be inserted therein without rotating the plug.

3. An attachment plug for screw threaded electric lamp sockets comprising an insulating base, a center contact carried by said base, an outer contact, means for expanding and contracting said last mentioned contact, binding screws for the leading-in wires, and means for locking said movable contact at both limits of its movement.

4. An attachment plug for electric lamp sockets comprising an insulating base, a lamp contact carried by said base, a ring having a slot formed therein, said slot being adapted to engage said lamp contact, and means for rotating said ring whereby said contact is held in firm engagement with said socket when said plug is in position therein.

5. An attachment plug for electric lamp sockets comprising an insulating base, said base being formed with two diameters, a center contact carried by said base, an outer contact disposed upon the smaller of said diameters, a contact ring disposed upon the other of said diameters, said ring having a slot formed therein, said slot being adapted to engage the end of said last mentioned contact, means for rotating said ring to radially expand and contract said last mentioned contact, binding posts disposed upon the front of the plug, and a removable metal casing or cap for said binding posts.

6. An attachment plug having a center contact, a spreading outer contact, means for manually closing said outer contact, and means for locking said outer contact at both limits of its movement.

7. An attachment plug for electric lamp sockets, comprising an insulating base, a movable contact carried by said base and tending to move outwardly into engagement with the socket, and means for manually moving said contact inwardly to disengage the same from the lamp socket to permit the plug to be removed therefrom.

8. An attachment plug having an insulating plug portion, a contact on the end of said plug, and a resilient contact finger secured to the end of said plug adjacent said contact and adapted to yield toward said plug.

9. An attachment plug having an insulating plug portion, a contact on the end of said plug and a resilient contact finger secured to the end of said plug adjacent said contact and adapted to yield toward said plug, and means for manually moving said finger toward said plug.

10. An attachment plug having a center and contact, a yieldable side contact having one of its ends secured adjacent said end contact and its opposite end movable, and means for manually moving said last-named end.

11. An attachment plug having an insulating body part provided with a plug, a contact on the end of said plug, and spring contact fingers mounted on said end and adapted to yield toward said plug.

12. An attachment plug having an end contact, an expansive outer contact, and manually operable means for contracting said outer contact.

13. An attachment plug comprising an insulating member adapted to be thrust endwise into a socket or receptacle, an end contact on said member, an expansive outer contact, and manually operable means for contracting said outer contact, whereby the device may be withdrawn from the socket or receptacle.

14. In an attachment plug, an insulating plug, a center contact on the end of said plug, a corrugated metallic strip secured to said plug adjacent the outer end of said plug, said strip tending by its resiliency to move away from said plug, and manually operable means for moving said strip toward said plug to permit the insertion of the device into a receiving socket.

15. In an attachment plug, an insulating plug, a contact strip extending longitudinally of said plug and tending to move away from said plug, and means for manually moving said strip toward said plug to permit insertion of the plug into a receiving socket.

In witness whereof, I have hereunto subscribed my name in the presence of two witnesses.

REUBEN B. BENJAMIN.

Witnesses:
 M. R. ROCHFORD,
 EMMA A. OLSEN.